(12) United States Patent
Tsuboi

(10) Patent No.: US 6,462,119 B1
(45) Date of Patent: Oct. 8, 2002

(54) CERAMIC POWDER, YARN, CLOTH, MOLDED PRODUCT, WATER CONDITIONER AND SOIL CONDITIONER

(75) Inventor: Susumu Tsuboi, Kyoto (JP)

(73) Assignee: Nihon Denshi Keiraku Kenkoukai, Inc. (JP)

( * ) Notice: Subject to any disclaimer, the term of this patent is extended or adjusted under 35 U.S.C. 154(b) by 0 days.

(21) Appl. No.: 09/365,502

(22) Filed: Aug. 2, 1999

(30) Foreign Application Priority Data

Aug. 5, 1998 (JP) .......................................... 10-221983

(51) Int. Cl.⁷ ................................................. C08K 3/34
(52) U.S. Cl. ....................... 524/430; 501/128; 524/431; 524/432; 524/433; 524/492
(58) Field of Search ..................... 501/1, 128; 524/430, 524/431, 432, 433, 492

(56) References Cited

U.S. PATENT DOCUMENTS

| | | | | |
|---|---|---|---|---|
| 3,607,025 A | * | 9/1971 | Jacobson | 23/110 |
| 4,017,289 A | * | 4/1977 | Hoda | 65/18 |
| 5,106,797 A | * | 4/1992 | Allaire | 501/155 |
| 5,188,780 A | * | 2/1993 | Lange et al. | 264/63 |
| 5,874,175 A | * | 2/1999 | Li | 428/457 |
| 6,001,157 A | * | 12/1999 | Nogami | 106/18.3 |

* cited by examiner

Primary Examiner—Edward J. Cain
(74) Attorney, Agent, or Firm—Ronald E. Greigg

(57) ABSTRACT

Ceramic powders comprises powders of not more than 100 mesh which are obtained by forming a mixture including $Al_2O_3$ (alumina), $SiO_2$ (silica), FeO (iron oxide), NaO (soda), MgO (magnesium oxide), KOH (potassium hydroxide) and NaCl (sodium chloride) into ceramic, followed by pulverization; and powders of not less than 99% purity selected from a group consisting of V (vanadium), Al (aluminum), Ti (titanium), Cr (chromium), Mn (Manganese), Fe (iron), Co (cobalt), Ni (nickel), P (phosphorus), Cu (copper), Zu (zinc), Y (yttrium), Mg (magnesium), S (sulfur), NFe (iron nitride), BrK (potassium bromide) and IRb (rubidium iodide).

12 Claims, 5 Drawing Sheets

CERAMIC POWDER, YARN, CLOTH, MOLDED PRODUCT, WATER CONDITIONER AND SOIL CONDITIONER

BACKGROUND OF THE INVENTION

1. Field of the Invention

The present invention relates to ceramic powder and to application technologies thereof.

2. Prior Art

A variety of technologies applicable to one's health have been proposed hitherto, including health appliances using electrodes for supplying weak electric current and health bedding designed to recover one's health during sleep including bed clothes, sheets and pillows using a magnetic body or aromatic components to obtain magnetic or aromatic medical-treatment effects.

However, the prior art which used a conventional type of power-supply unit or electronic circuit had the disadvantage that the power must be kept in connection during use and the disadvantage of a possible failure of the electronic circuit and the resultant unstable use.

On the other hand, the prior art which used a magnetic body or aromatic components to produce magnetic or aromatic medical-treatment effects involved the disadvantage that the magnetic body or the aromatic components must be changed with frequency, for lack of continuance of the effectiveness, thus involving troublesome works.

SUMMARY OF THE INVENTION

The present invention provides ceramic powders comprising powders of not more than 100 mesh which are obtained by forming a mixture including $Al_2O_3$ (alumina), $SiO_2$ (silica), FeO (iron oxide), NaO (soda), MgO (magnesium oxide), KOH (potassium hydroxide) and NaCl (sodium chloride) into ceramic, followed by pulverization, mixed with powders of not less than 99% purity selected from a group consisting of V (vanadium), Al (aluminum), Ti (titanium), Cr (chromium), Mn (Manganese), Fe (iron), Co (cobalt), Ni (nickel), P (phosphorus), Cu (copper), Zu (zinc), Y (yttrium), Mg (magnesium), S (sulfur), NFe (iron nitride), BrK (potassium bromide) and IRb (rubidium iodide).

The ceramic powders may comprise at least any two of components of Li, C, N and F; at least any four of components of Na, Mg, Al, Si, P, S and Cl; and Fe, Ni and at least any three of components of K, Ca, Ti, Cr, Mn, Zn, Cu and Co.

Also, the present invention provides a yarn formed of fibers mixing therein the ceramic powders.

In addition, the present invention provides a cloth to which the ceramic powders are allowed to adhere.

Further, the present invention provides a molded product formed by the ceramic powders being mixed into resin to be molded.

Further, the present invention provides a water conditioner containing therein the ceramic powders. Further, the present invention provides a soil conditioner containing therein the ceramic powders.

According to the present invention, according to which the ceramic powders are produced by atomizing the compound comprising (i) powders of not more than 100 mesh which are obtained by forming the mixture including $Al_2O_3$ (alumina), $Si_2$ (silica), FeO (iron oxide), NaO (soda), MgO (magnesium oxide), KOH (potassium hydroxide) and NaCl (sodium chloride) into ceramic, followed by pulverization and (ii) powders of not less than 99% purity selected from a group consisting of V (vanadium), Al (aluminum), Ti (titanium), Cr (chromium), Mn (Manganese), Fe (iron), Co (cobalt), Ni (nickel), P (phosphorus), Cu (copper), Zu (zinc), Y (Yttrium), Mg (magnesium), S (sulfur), NFe (iron nitride), BrK and IRb, the following operation and effects are produced with efficiency.

The ceramic powder produced by atomizing the compound comprising at least any two of components of Li, C, N and F; at least any four of components of Na, Mg, Al Si, P, S and Cl; and Fe, Ni and at least any three of components of K, Ca, Ti, Cr, Mn, Zn, Cu and Co produces the same efficiency as follows.

BRIEF DESCRIPTION OF THE DRAWINGS

These and other objects and advantages of the invention will become more apparent upon a reading of the following detailed description and drawings, in which.

DETAILED DESCRIPTION OF THE PREFERRED EMBODIMENT

EMBODIMENT 1

The ceramic powder of the present invention is yielded by atomizing the compound comprising (i) powders of not more than 100 mesh which are obtained by forming the mixture including $Al_2O_3$ (alumina), $SiO_2$ (Silica), FeO (iron oxide), NaO (soda), MgO (magnesium oxide), KOH (potassium hydroxide) and NaCl (sodium chloride) into ceramic, followed by pulverization and (ii) powders of not less than 99% purity selected from a group consisting of V (vanadium), Al (aluminum), Ti (titanium), Cr, (chromium), Mn (Manganese), Fe (iron), Co (cobalt), Ni (nickel), P (phosphorus), Cu (copper), Zu (zinc), Y (yttrium), Mg (magnesium), S (sulfur), NFe (iron nitride), BrK and IRb. It is to be noted that the metallic compounds included in the oxides are not required to be mixed in the form of a high purity metal.

Another ceramic powder of the present invention is yielded by atomizing the compound comprising at least any two of components of Li, C, N and F; at least any four of components of Na, Mg, Al, Si, P, S and Cl; and Fe, Ni and at least any three of components of K, Ca, Ti, Cr, Mn, Zn, Cu and Co.

Further, the ceramic powder of the present invention has deodorant properties.

Referring now to the accompanying drawings, the bedding of EMBODIMENT 1 of the present invention will be detailed below.

Figure 1:
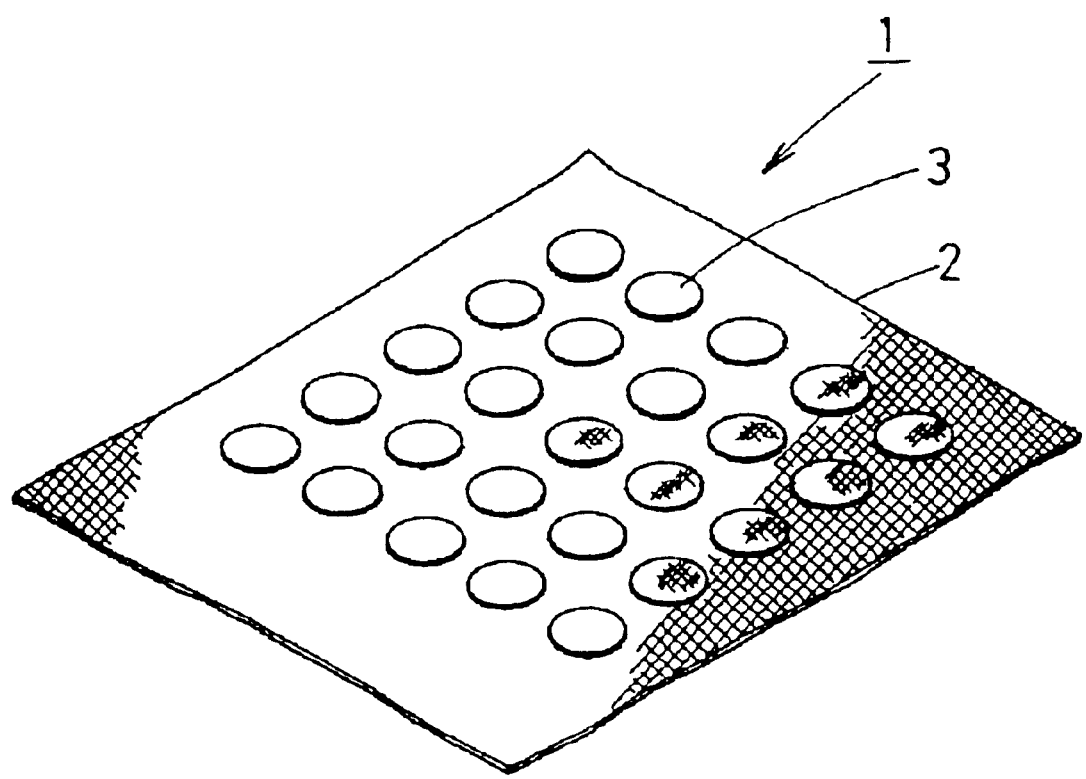
FIG. 1 is a perspective view of a part of a bedding of an embodiment of the present invention.
Figure 2:
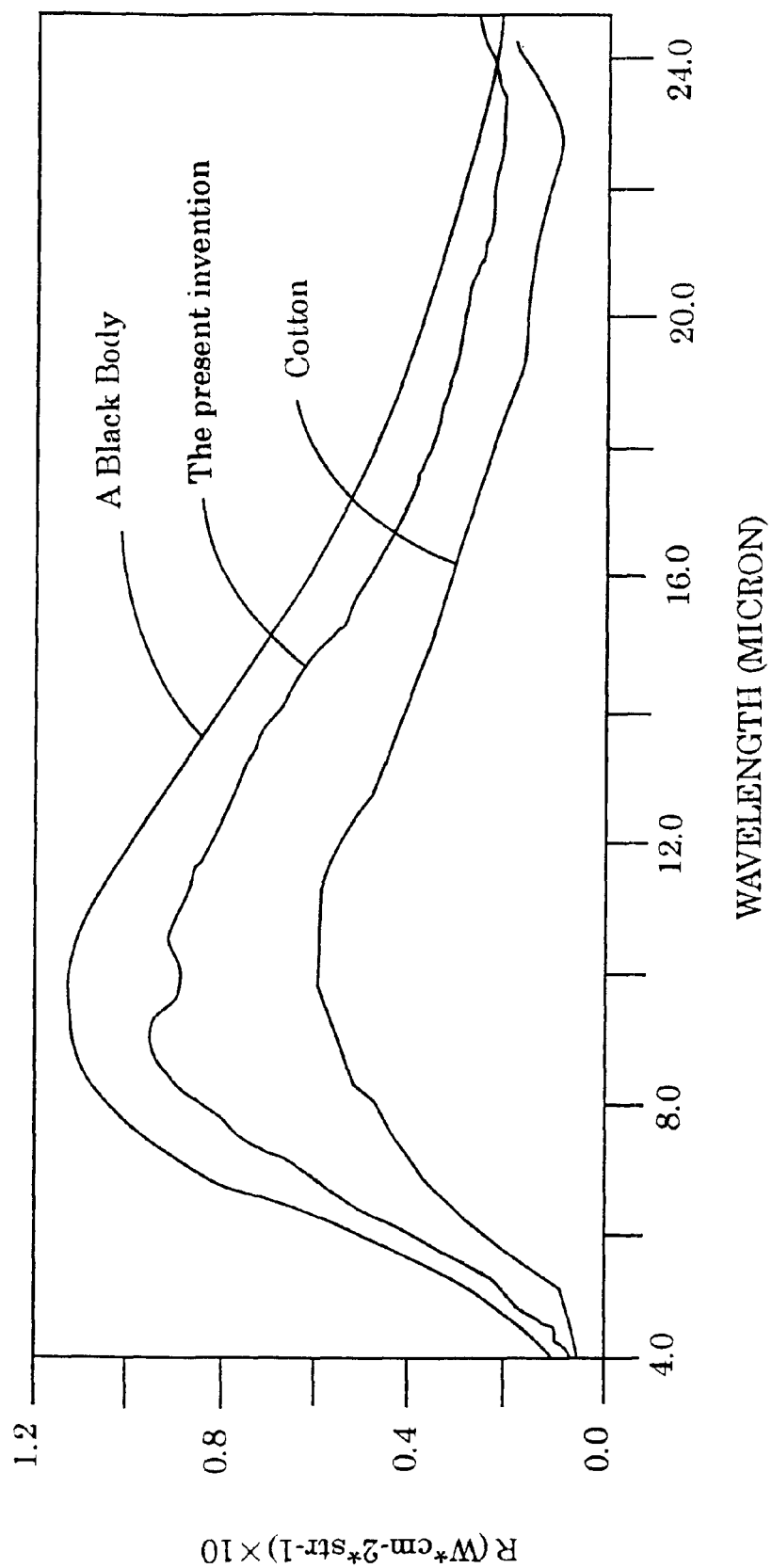
FIG. 2 is a diagram showing a radiant intensity of a material according to the present invention.
Figure 3:
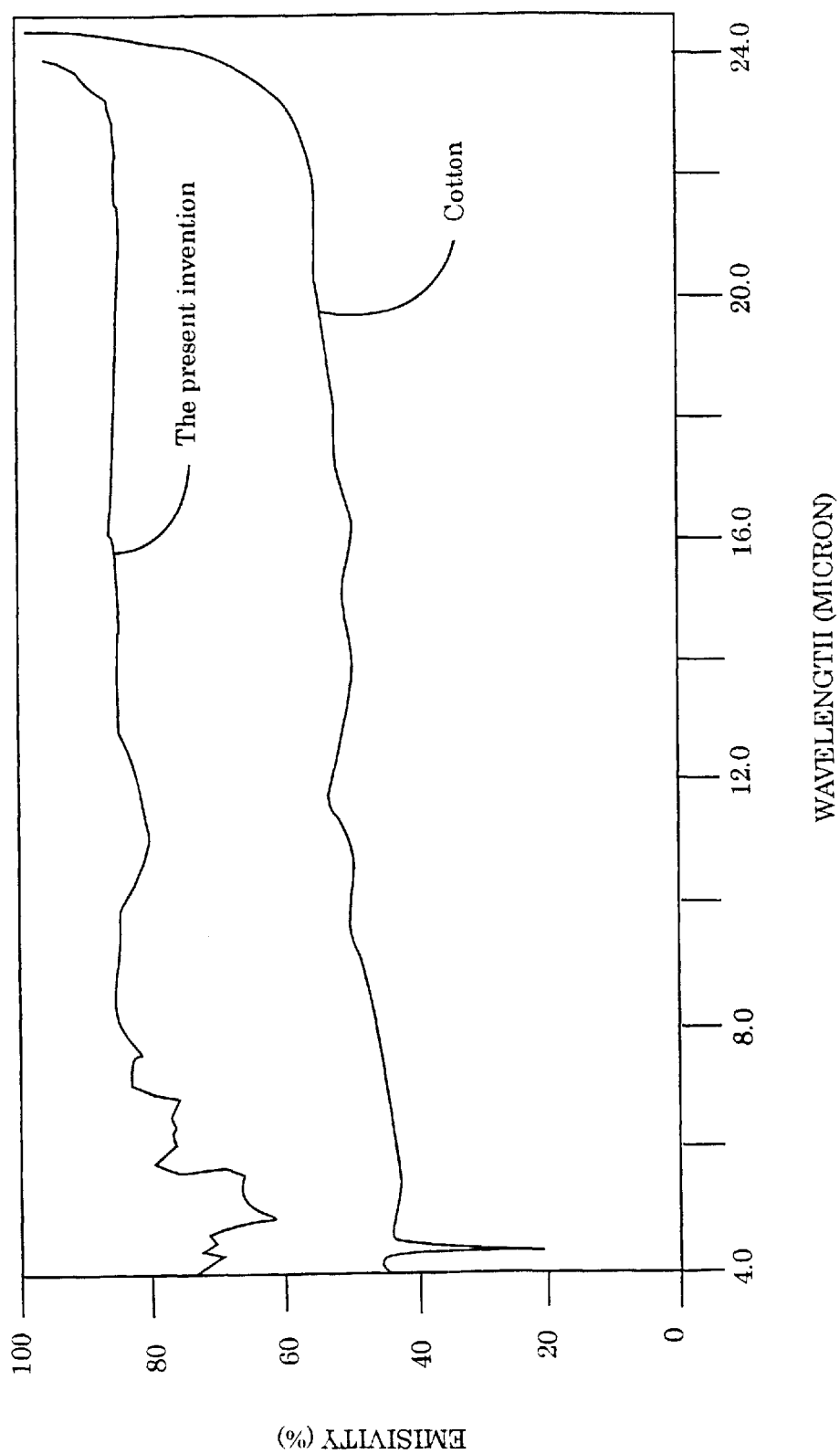
FIG. 3 is a diagram showing emissivity of a material according to the present invention.
Figure 4:
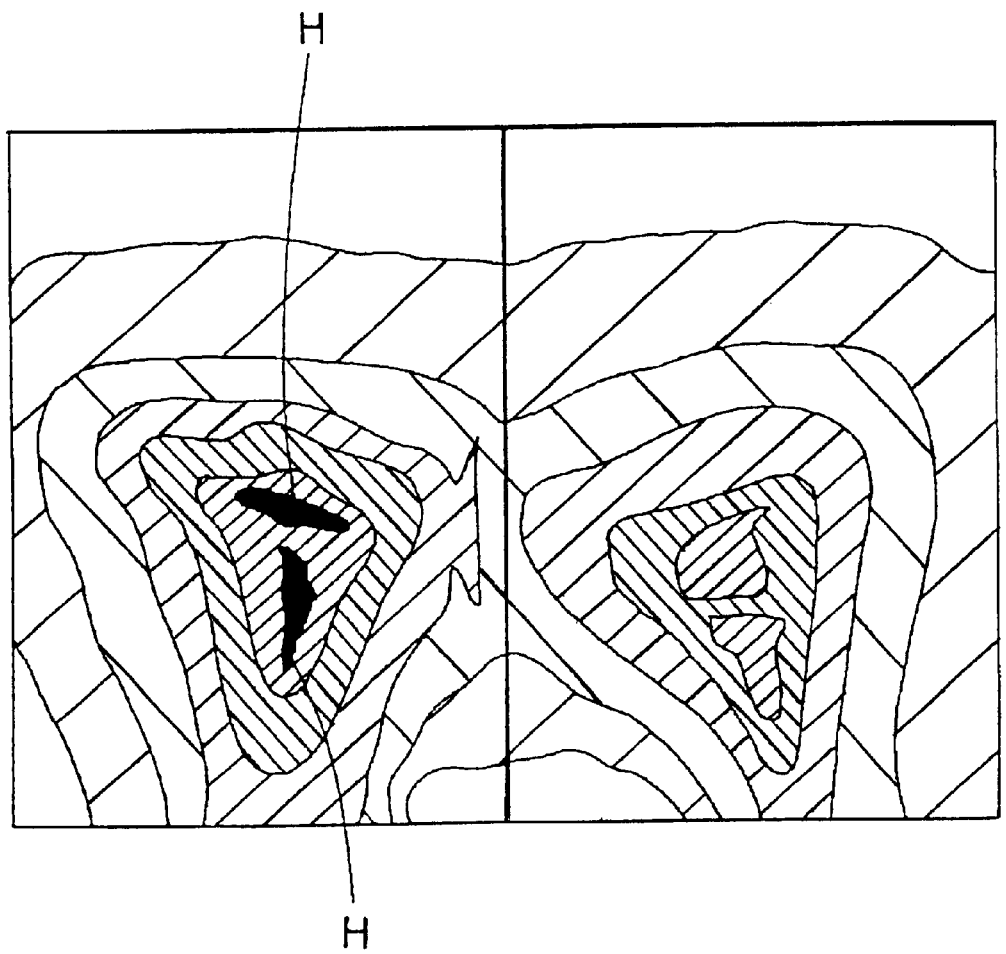
FIG. 4 is an illustration showing a thermographic property of a material according to the present invention.
Figure 5:
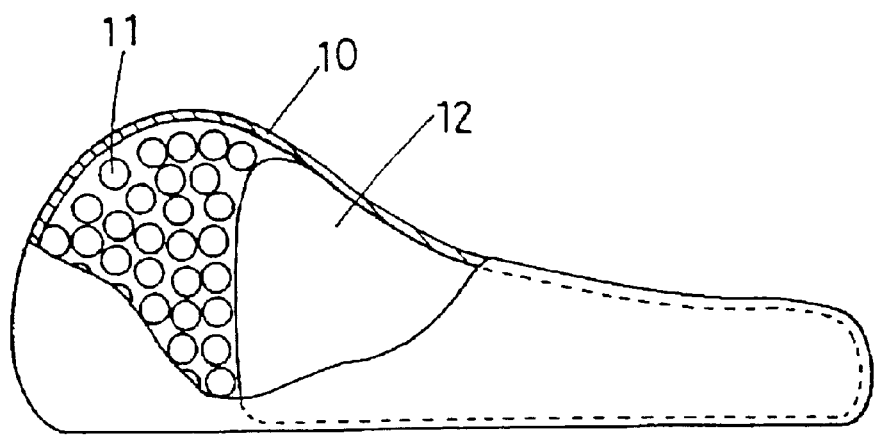
FIG. 5 is a sectional view showing the structure of a pillow according to the present invention.
Figure 6:
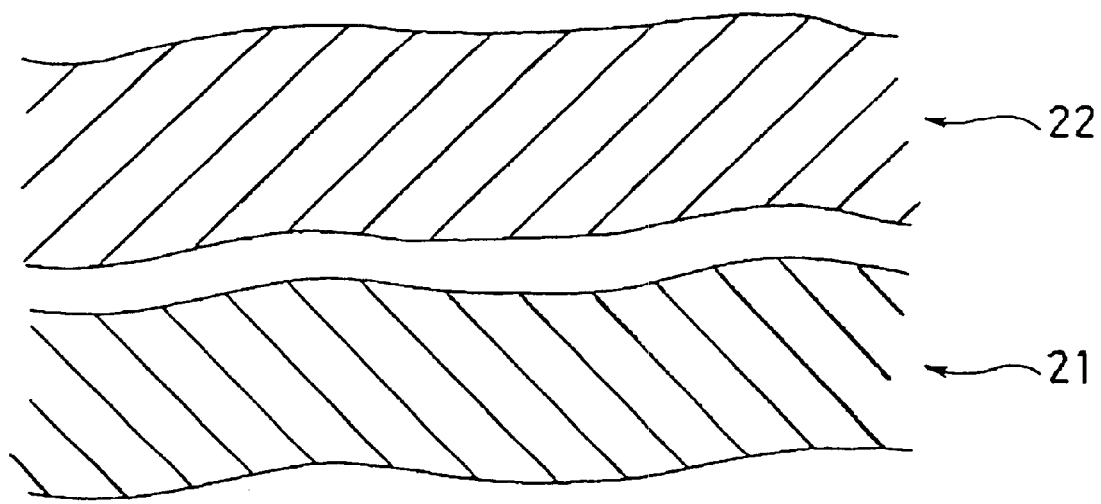
FIG. 6 is a sectional view showing the structure of a bed cloth according to the present invention.

FIG. 1 is a sectional view of a part of a sheet of one embodied form of the bedding according to the present invention.

In FIG. 1, a number of porous ceramic layers 3 of a circular shape are formed on a front surface of a cloth 2 forming a sheet 1.

The porous ceramic layers 3 each contain the ceramic powders yielded by atomizing the compound comprising (i) powders of not more than 100 mesh which are obtained by forming the mixture including $Al_2O_3$ (alumina), $SiO_2$ (silica), FeO (iron oxide), NaO (soda), MgO (magnesium oxide), KOH (potassium hydroxide) and NaCl (sodium chloride) into ceramic, followed by pulverization and (ii) powders of not less than 99% purity selected from a group consisting of V (vanadium), Al (aluminum), Ti (titanium), Cr (chromium), Mn (Manganese), Fe (iron), Co (cobalt), Ni (nickel), P (phosphorus), Cu (copper), Zu (zinc), Y (yttrium), Mg (magnesium), S (sulfur), NFe (iron nitride), BrK and IRb.

This is applicable to bedding, pillows, blankets and the like as well as to the sheet 1.

The bedding is formed of a fabric using yarns formed by fibers of synthetic fiber, cotton, silk, rayon and the like mixing therein the ceramic powders which are yielded by atomizing the compound comprising (i) powders of not more than 100 mesh which are obtained by forming the mixture including e.g. $Al_2O_3$, (alumina), $SiO_2$ (silica), FeO (iron oxide), NaO (soda), MgO (magnesium oxide), KOH (potassium hydroxide) and NaCl (sodium chloride) into ceramic, followed by pulverization and (ii) powders of not less than 99% purity selected from a group consisting of V (vanadium), Al (aluminum), Ti (titanium), Cr (chromium), Mn (Manganese), Fe (iron), Co (cobalt), Ni (nickel), P (phosphorus), Cu (copper), Zu (zinc), Y (Yttrium), Mg (magnesium), S (sulfur), NFe (iron nitride), BrK and IRb.

Alternatively, the bedding may be formed by using a fabric to which the ceramic powders are allowed to adhere by printing or adhesive bonding.

The same effects which will be described below can be obtained when the ceramic powders mixed therein may comprise at least any two of components of Li, C, N and F; at least any four of components of Na, Mg, Al, Si, P, S and Cl; and Fe, Ni and at least any three of components of K, Ca, Ti, Cr, Mn, Zn, Cu and Co.

In the case of a sleeping mat, the sleeping mat according to the present invention is so designed as to have excellent durability, adequate hardness and air permeability of 90% porosity, thus producing the effects of preventing bedsore and preventing mold due to moisture from growing.

While the preferred embodiments of the invention have been described, it is to be understood that various changes and modifications may be made in the invention without departing from the spirit of the present invention. The scope of the invention, therefore, is to be determined solely by the following claims.

What is claimed is:

1. Ceramic powders comprising:

powders of not more than 100 mesh which are obtained by forming a mixture including $Al_2O_3$ (alumina), $SiO_2$ (silica), FeO (iron oxide), $Na_2O$ (soda), MgO (magnesium oxide), KOH (potassium hydroxide) and NaCl (sodium chloride) into ceramic, followed by pulverization; and powders of not less than 99% purity of at least one component of a group consisting of V (vanadium), Al (aluminum, Ti (titanium), Cr (chromium), Mn (Manganese), Fe (iron), Co (cobalt), Ni nickel), P (phosphorus), Cu (copper), Zu (zinc), Y (yttrium), Mg (magnesium, S (sulfur), NFe (iron nitride), BrK (potassium bromide and IRb (rubidium iodide).

2. Ceramic powders comprising;

at least any two of components of Li, C, N and F;

at least any four of components of Na, Mg, Al, Si, P, S and Cl; and

Fe, Ni and at least any three of components of K, Ca, Ti, Cr, Mn, Zn, Cu and Co.

3. A yarn formed of fibers mixing therein the ceramic powders of claim 1.

4. A yarn formed of fibers mixing therein the ceramic powders of claim 2.

5. A cloth to which the ceramic powders of claim 1 are allowed to adhere.

6. A cloth to which the ceramic powders of claim 2 are allowed to adhere.

7. A molded product formed by the ceramic powders of claim 1 being mixed into resin to be molded.

8. A molded product formed by the ceramic powders of claim 2 being mixed into resin to be molded.

9. A water conditioner containing therein the ceramic powders of claim 1.

10. A water conditioner containing therein the ceramic powders of claim 2.

11. A soil conditioner containing therein the ceramic powders of claim 1.

12. A soil conditioner containing therein the ceramic powders of claim 2.

* * * * *